US012791855B2

(12) United States Patent
Zanden et al.

(10) Patent No.: US 12,791,855 B2
(45) Date of Patent: Nov. 10, 2026

(54) HEAD UP OR HEAD MOUNTED DISPLAY ARRANGEMENT AND A METHOD FOR PRESENTING AT LEAST ONE IMAGE VIA AT LEAST ONE SURFACE ELEMENT OF A HEAD UP OR HEAD MOUNTED DISPLAY ARRANGEMENT

(71) Applicant: SAAB AB, Linkoeping (SE)

(72) Inventors: Johan Zanden, Norrahammar (SE); Anna-Karin Holmer, Joenkoeping (SE); Stefan Andersson, Habo (SE)

(73) Assignee: SAAB AB, Linköping (SE)

( * ) Notice: Subject to any disclaimer, the term of this patent is extended or adjusted under 35 U.S.C. 154(b) by 373 days.

(21) Appl. No.: 18/052,291

(22) Filed: Nov. 3, 2022

(65) Prior Publication Data

US 2023/0087464 A1 Mar. 23, 2023

Related U.S. Application Data

(62) Division of application No. 16/332,454, filed as application No. PCT/SE2016/050872 on Sep. 16, 2016, now abandoned.

(51) Int. Cl.
*G02B 27/01* (2006.01)
*G02B 6/08* (2006.01)

(52) U.S. Cl.
CPC ........... *G02B 27/0101* (2013.01); *G02B 6/08* (2013.01)

(58) Field of Classification Search
CPC .............................. G02B 27/0101; G02B 6/08
(Continued)

(56) References Cited

U.S. PATENT DOCUMENTS 5,348,477 A 9/1994 Welch et al.
5,502,457 A * 3/1996 Sakai ................ G02F 1/133524 385/116

(Continued)

FOREIGN PATENT DOCUMENTS

EP 0384880 A2 8/1990
EP 550155 A2 * 7/1993

(Continued)

OTHER PUBLICATIONS

Translation of JP_H06160887_A (Year: 2025).*

(Continued)

*Primary Examiner* — Jerry L Brooks
(74) *Attorney, Agent, or Firm* — ALSTON & BIRD LLP

(57) ABSTRACT

A head up or head mounted display arrangement and a method for presenting at least one image via at least one surface element of a head up or head mounted display arrangement is disclosed. The arrangement comprises at least one image generating element arranged to generate an image in a first image plane, at least one surface element, and a fibre optic face plate. A second image plane lies at the second surface and the at least one surface element is arranged in the beam path from the second surface. The first image plane comprises a plurality of first part image planes each associated with an individual first part surface of the fibre optic face plate and/or the second image plane comprises a plurality of second part image planes each associated with an individual second part surface of the fibre optic face plate.

11 Claims, 4 Drawing Sheets

(58) Field of Classification Search
USPC .......................................................... 353/630
See application file for complete search history.

(56) References Cited

U.S. PATENT DOCUMENTS

| | | | |
|---|---|---|---|
| 7,982,959 | B1 | 7/2011 | Lvovskiy et al. |
| 8,666,212 | B1 | 3/2014 | Amirparviz |
| 2004/0001679 | A1 | 1/2004 | Sisodia |
| 2016/0131906 | A1 | 5/2016 | Dopilka et al. |

FOREIGN PATENT DOCUMENTS

| | | | | | |
|---|---|---|---|---|---|
| EP | 1376168 | A1 | * | 1/2004 | G02B 6/06 |
| JP | H0688960 | A | * | 3/1994 | |
| JP | H06160887 | A | * | 6/1994 | |
| JP | H10319343 | A | * | 12/1998 | |
| WO | WO 93/10519 | A1 | | 5/1993 | |
| WO | WO 2015/136288 | A1 | | 9/2015 | |

OTHER PUBLICATIONS

Translation of JP_H0688960_A (Year: 2025).*
Translation of JP_H10319343_A (Year: 2025).*
Translation of JP H0688960 (Year: 2026).*
U.S. Appl. No. 16/332,454, filed Mar. 12, 2019, US 2021-0286175, Abandoned.
Extended European Search Report for European Application No. 17191463.3 dated Mar. 16, 2018, 8 pages.
International Preliminary Report on Patentability Chapter II for International Application No. PCT/SE2016/050872 dated Jan. 8, 2019, 17 pages.
International Search Report and Written Opinion for International Application No. PCT/SE2016/050872 dated Jun. 16, 2017, 14 pages.
European Patent Office, Communications pursuant to Article 94(3) EPC received for Application No. 17191463.3, dated Jun. 2, 2021, 5 pages, Germany.
Intellectual Property India, Examination Report received for Application No. 201917010874, dated May 17, 2021, 6 pages, India.
European Patent Office, Communication pursuant to Article 94(3) EPC received for Application No. 17191463.3, dated Apr. 4, 2023, 5 pages, Germany.

* cited by examiner

HEAD UP OR HEAD MOUNTED DISPLAY ARRANGEMENT AND A METHOD FOR PRESENTING AT LEAST ONE IMAGE VIA AT LEAST ONE SURFACE ELEMENT OF A HEAD UP OR HEAD MOUNTED DISPLAY ARRANGEMENT

CROSS-REFERENCE TO RELATED APPLICATIONS

This application is a divisional of U.S. application Ser. No. 16/332,454, filed Mar. 12, 2019, which application is a National Stage Application, filed under 35 U.S.C. § 371, of International Application No. PCT/SE2016/050872, filed Sep. 16, 2016, the contents of both of which as are hereby incorporated by reference in their respective entireties.

BACKGROUND

Technical Field

The present disclosure relates to head up or head mounted display arrangements, wherein an image generated by an image generating element is displayed via a surface element.

The present disclosure further relates to a method for presenting at least one image via at least one surface element of a head up or head mounted display arrangement, comprising the steps of generating an image and direct the image to the surface element.

Related Art

When using Head UP Displays, HUDs, there are often constraints regarding size and weight of optical components. Although optical components like lenses themselves might have limited size, they require considerable space around them since optical paths have to be provided so that the light will be focused on the right place. Light from different sources might make this even more problematic since the optical path from each light source to the display may needs a certain size. Further, having different light sources may make it difficult to adjust all paths so that the final picture from each path will be provided at the same image plane.

U.S. Pat. No. 7,982,959 discloses embodiments of a HUD-system wherein images formed beside each other and overlaying images are present.

BRIEF SUMMARY

An object of the present disclosure is to provide devices and a method which seek to mitigate, alleviate, or eliminate one or more of the above-identified deficiencies in the art and disadvantages singly or in any combination.

In this disclosure, a solution to the problem outlined above is proposed. The solution is based on the below described techniques that use a face plate to transfer images from at least one image generator element via at least one surface element. Said surface element can be a combiner.

The above objects are obtained by a head up or head mounted display arrangement. The arrangement comprises at least one image generating element arranged to generate an image in a first image plane, at least one surface element, and a fibre optic face plate comprising a first side having a first surface and a second side having a second surface, said fibre optic face plate being arranged to transmit light incident on the first surface to the second surface. The face plate is arranged in relation to the at least one image generating element such that the first surface lies at the first image plane. A second image plane lies at the second surface and the at least one surface element is arranged in the beam path of light emitted from the second surface. The first image plane comprises a plurality of first part image planes each first part image plane associated with an individual first part surface of the first side of the fibre optic face plate and/or the second image plane comprises a plurality of second part image planes each second part image plane associated with an individual second part surface of the second side of the fibre optic face plate.

One big advantage of the solution is that the fibres of faceplates are much easier to adapt to a given (constrained) geometry than light travelling in free space. Lenses or the like, if needed, can then instead be placed at other places with less space constraints, and the light can then through the faceplate be translated to an image plane.

Another advantage is that major parts of the optical transmissions can be made through the fibres of the face plate. This provides for a robust solution. Further, the solution is less sensitive to vibrations/forces. Arrangements wherein the major optical paths are formed in free space between optical elements such as lenses would characteristically be more sensitive to minor displacements of the optical components, which displacement could occur due to vibrations/forces acting on the arrangement.

In using a fibre optic face plate, a good way to transfer an image is achieved without affecting the focus of the image. To achieve the same effect with conventional optical elements, an extensive optical system is needed with side effects such as geometrical distortion.

The surface element may be a helmet mounted surface element.

In practice, the first side of the fibre optic face plate comprises characteristically first optical fibre ends and the second side of the fibre optic face plate comprises corresponding second optic fibre ends. The fibre optic face plate is arranged to transfer light from the first surface to the second surface through the optical fibres.

The number of first part image planes may be different from the number of second part image planes.

In different embodiments, at least one second image plane is a focused image plane.

In different embodiments, an optical arrangement is arranged between at least one of the image generating elements and the corresponding first surface.

The at least one image generating element may comprise a display such as a Liquid Crystal Display.

The at least one head up or head mounted display arrangement may comprise a Head Up Display, HUD.

In different embodiments, the head up or head mounted display arrangement further comprises display image projecting optics arranged in the beam path from the second surface and arranged to project light incident from the second surface via the at least one surface element.

The display image projecting optics may comprise at least one semi-transparent beam splitting element arranged to project the light incident from the second surface to the at least one surface element so that the image of the second image plane is visible via the surface element through said at least one semi-transparent beam splitting element.

Thereby, a head up or head mounted arrangement is obtained which is practical to implement in any head up or head mounted display arrangement.

In different embodiments the head up or head mounted display arrangement comprises at least two image generating elements each arranged to generate an image in the first part image plane at its associated first part surface of the first side of the fibre optic face plate.

Thus, the fibre optic face plate can combine transmission of images from a plurality of image generating elements. The fibres of different fibre optic face plate parts may have different lengths so as to translate the light to the second side. This will allow combining light from image generating elements where image planes do not coincide. The image generating elements can be arbitrarily spaced apart. This allows light from different image generating elements to be combined to generate a common image plane. By that, light from several image generating elements can simultaneously be displayed by the head up or head mounted display arrangement via the surface element.

The first part surfaces of the first side of the fibre optic face plate may be arranged in different surface planes or lie in a common surface plane.

In different embodiments, light incident on the respective first part surface is transmitted to a corresponding second part surface on the second side.

To achieve this, the fibre ends at one first surface part are all connected to fibre ends at a corresponding second surface part, while the fibre ends at another first surface part are all connected to fibre ends at a corresponding second surface part.

In different embodiments, the fibre optic face plate is arranged to transfer at least parts of the images generated by the different image generating elements to adjacent positions, such as adjacent pixels and/or image points in a common second surface.

In different embodiments, the second part surfaces of the second side of the fibre optic face plate may be arranged in different surface planes or lie in a common surface plane.

Thus, the images from the different image generating elements can for example be displayed beside each other. To achieve this, the fibre ends of one first part surface can all be put on one side of the common second image plane and the fibre ends from another part surface can all be put on the other side of the common second image plane.

Alternatively, at least parts of the images generated by the different image generating elements are transmitted to adjacent positions at the second surface. Thereby, the images from the different image generating elements can be "overlaying". This can be achieved by mixing at the second surface the ends of the fibres from different first surface parts. Instead of first arranging all ends of the fibres from the first surface part and then arranging all ends of the fibres from another first surface part, the fibre ends are mixed at the second surface so that, for example, a fibre end from one first surface part is beside a fibre end from another first surface part, and so on. The final image will thus look as if two (or more) images are overlaid each other.

In different embodiments, the second surface comprises a plurality of part surfaces each intended for a dedicated surface element.

In different embodiments, incident light is for each position of the first surface transmitted to a plurality of second surface parts.

This can for example be achieved in that double fibres or double fibre bundles are provided for each position within the image from the image generating element, a first fibre of each pair or bundle part of each bundle is associated to one second surface part and the other fibre of each pair or bundle part of each bundle is associated to another second surface part.

Thus, instead of combining light from different image generating elements into a common display, the face plate is used to divide light from one image generating element into different second image planes. Thus, multiple images generated by one image generating element can be transferred to a plurality of second image planes.

The present disclosure further relates to a method presenting at least one image via at least one surface element. The method comprises generating an image in a first image plane; transmitting said image through a fibre optic face plate, said fibre optic face plate comprising a first side having a first surface lying in the first image plane, and a second side having a second surface lying in a second image plane; and projecting, the image from the second surface via the surface element arranged in the beam path of light emitted from the second surface. The first image plane comprises a plurality of first part image planes each first part image plane associated with an individual first part surface of the first side of the fibre optic face plate and/or the second image plane comprises a plurality of second part image planes each second part image plane associated with an individual second part surface of the second side of the fibre optic face plate.

BRIEF DESCRIPTION OF THE SEVERAL VIEWS OF THE DRAWING(S)

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 1 illustrates the fibres in an example of a fibre optic face plate. The top part illustrates the face plate fibres from the side and the bottom part illustrates the fibres from a top or bottom view. The bottom part shows a magnified cut out of the fibres.

FIGS. 6*a*-6*g* illustrate different examples of design of a fibre optic face plate for use in a head up or head mounted display arrangement.

Figure 7:
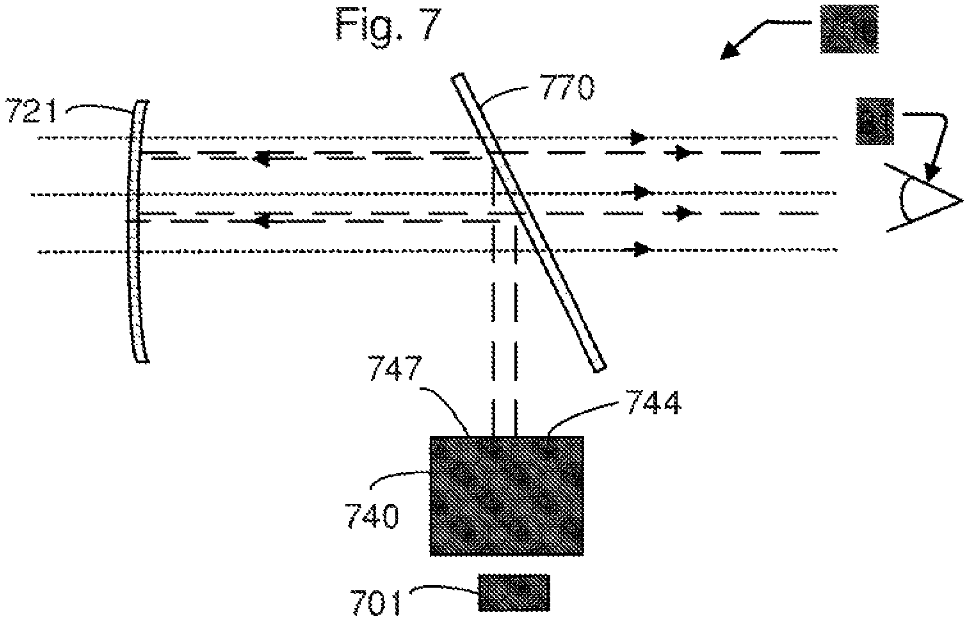

FIG. 7 illustrates generally an example of an implementation of a head up or head mounted display arrangement.

Figure 8:
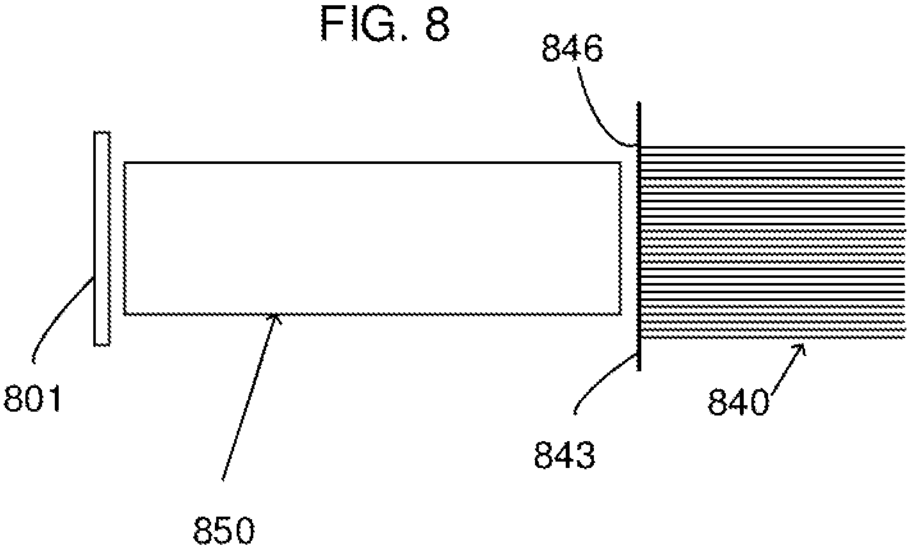

FIG. 8 illustrates a part of a head up or head mounted display arrangement according to an example.

Figure 9:
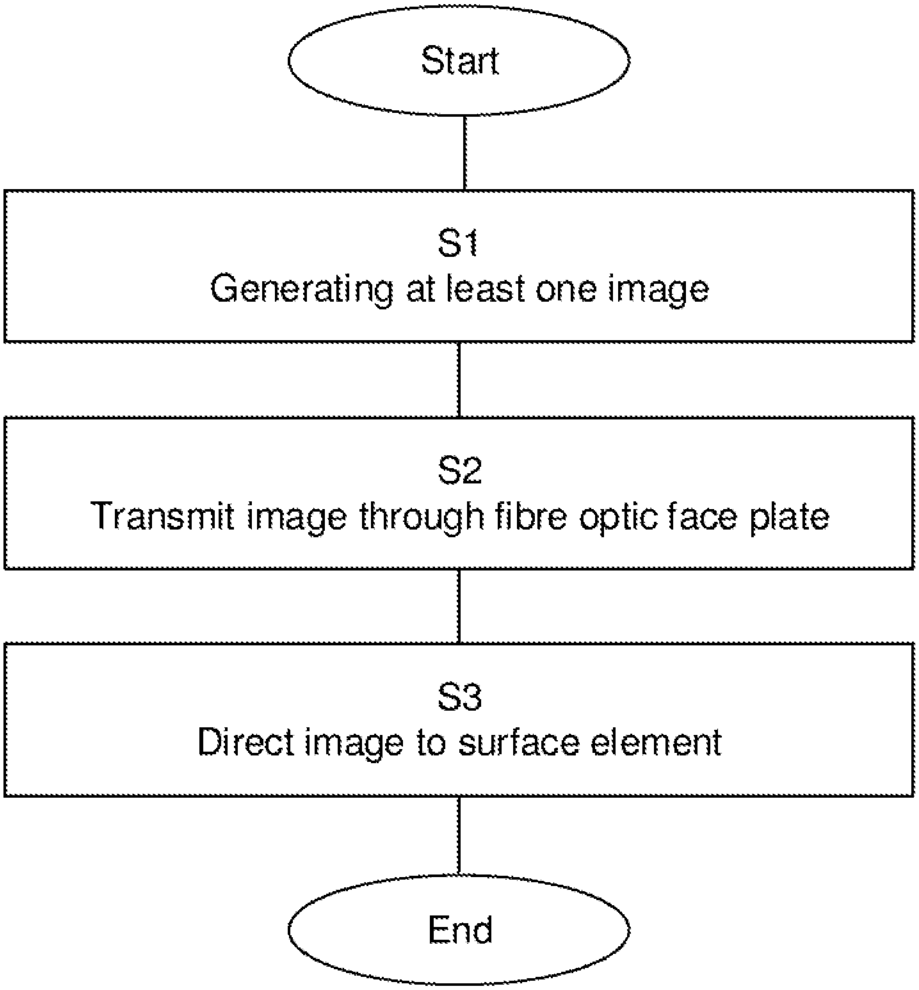

FIG. 9 is a flow chart illustrating a method for presenting at least one image on at least one surface element of a head up or head mounted display arrangement according to one example.

Additional details regarding various features illustrated within the figures are described in further detail below.

DETAILED DESCRIPTION OF VARIOUS EMBODIMENTS

Aspects of the present disclosure will be described more fully hereinafter with reference to the accompanying drawings. The apparatuses and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context dearly indicates otherwise.

It should be noted that the term transparent optical projection display relates to all types of transparent displays with optical projection. Such displays are for example Head Up Displays, or Helmet Mounted Displays, HMDs. The disclosed technology is sometimes throughout the description described using a HUD system as an example but it should be understood that the disclosed technology is equally applicable to all types of transparent optical projection displays.

The disclosure relates to head up or head mounted display arrangement. The arrangement comprises at least one image generating element arranged to generate an image in a first image plane, at least one surface element, and a fibre optic face plate comprising a first side having a first surface and a second side having a second surface, said fibre optic face plate being arranged to transmit light incident on the first surface to the second surface. The face plate is arranged in relation to the at least one image generating element such that the first surface lies at the first image plane. A second image plane lies at the second surface and the at least one surface element is arranged in the beam path from the second surface. The first image plane comprises a plurality of first part image planes each first part image plane associated with an individual first part surface of the first side of the fibre optic face plate and/or the second image plane comprises a plurality of second part image planes each second part image plane associated with an individual second part surface of the second side of the fibre optic face plate.

For example, there may be one first image plane and two second image plane parts or two first image plane parts and one second image plane. In practice, images in connection with the present disclosure are at the end usually projected on the retina. Thus, when referring to the fact that an image is presented via a surface element, this can imply that the surface element directs the image to at least one eye of an observer, where it might be projected on the retina(e) of said at least one eye.

Figure 1:
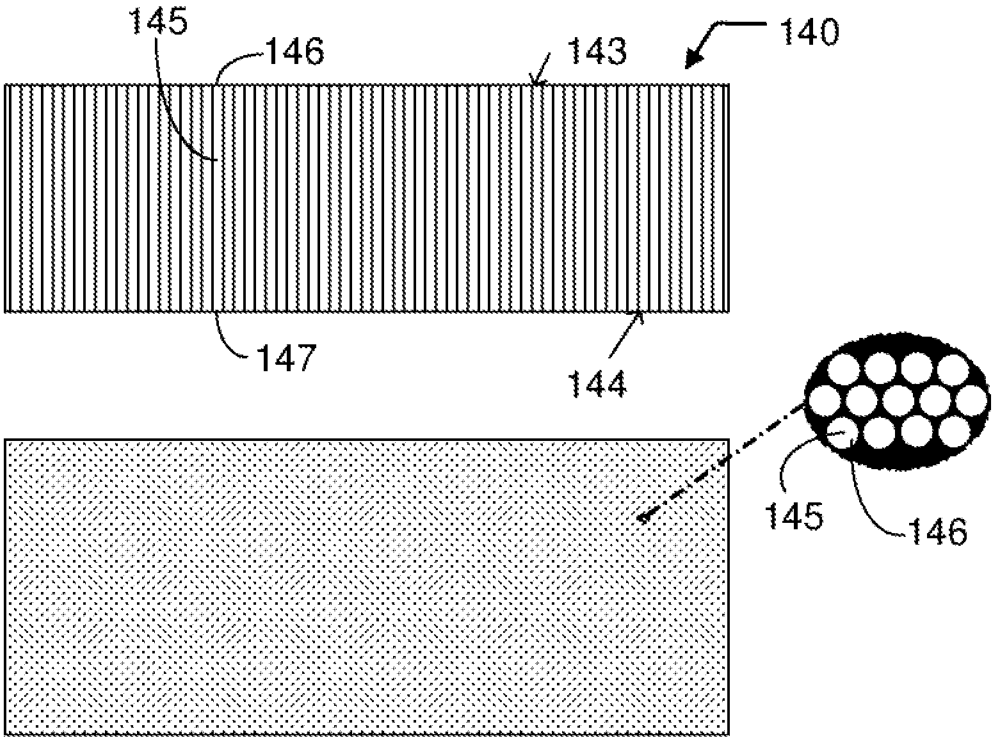

FIG. 1, a fibre optical face plate 140 is very schematically disclosed. The fibre optic face plate 140 is arranged to transfer light from a first surface 143 to a second surface 144 through optical fibres 145 (of which one is provided with a reference number). The first surface 143 comprises first optical fibre ends 146 of the optical fibres 145. The second surface 144 comprises corresponding second optical fibre ends 147 of the optical fibres 145.

The top part of FIG. 1 illustrates the face plate fibres 145 from the side and the bottom part illustrates the fibre ends 146, 147 from a top or bottom view. The top/bottom part shows also a magnified cut out of the fibres 145.

The number of fibres in the face plate can be selected for the particular implementation.

Further, the thickness of the fibres can be selected in accordance with the particular implementation.

The number of fibres or fibre bundles, together with the number of pixels of the image generating element, determines the resolution of the image. Each fibre or bundle of fibres can be seen as a pixel in the image. In one example, a pixel is about 100 micrometer in diameter. The image may for example be formed by means of 1400×650 pixels. However, these are only examples; the resolution, thickness of the fibres and number of fibres in each bundle is selected in accordance with the requirements of the particular implementation.

Thus, each fibre may form one pixel. Alternatively, a bundle comprising a plurality of fibres, such as 1000 fibres or more, may together form one pixel. The bundle forming the pixel may have a hexagon shaped cross section. All fibres in each bundle characteristically transmit the same information.

The orientation of the fibres in a face plate has the effect that a transfer of an image is possible. The transfer may for example be linear. It is important that the number of fibres in the face plate is large enough to keep a good resolution in the transferred image. In the transferred image the resolution can never be better than one image point per fibre. In other words, the number of fibres and the thickness of the fibres affect the resolution of the transferred image. The required number of fibres then of course depends on the required resolution of the transferred image; i.e. the configuration of the fibres in the face plate is chosen such that the resolution in the transferred image suits the purpose of use for the transferred image.

The shape of the fibre optic face plate can be designed for the particular implementation. In the illustrated schematic example, the face plate is for illustrative purposes thicker than it is long. In transparent optical projection display arrangements in accordance with this disclosure, the face plate is however characteristically extending in the fibre direction. Accordingly, the face plate may be longer than it is thick. The face plate can be rigid. The phase plate can be flexible. The face plate can have any shape along its extension. For example, it can be straight or bent. The face plate has in one example a rectangular vertical cross section. The face plate has in one example a circular shaped cross section. The face plate has in one example an elliptic cross section. The face plate surfaces can be flat or curved. The respective curved face plate surface can for example be convex or have a free form with changing local curvature across the surface. Also, the image plane curvature could be changed, e.g. from curved to flat or any desired surface topology, including magnification through tapering of the fibres.

Figure 2:
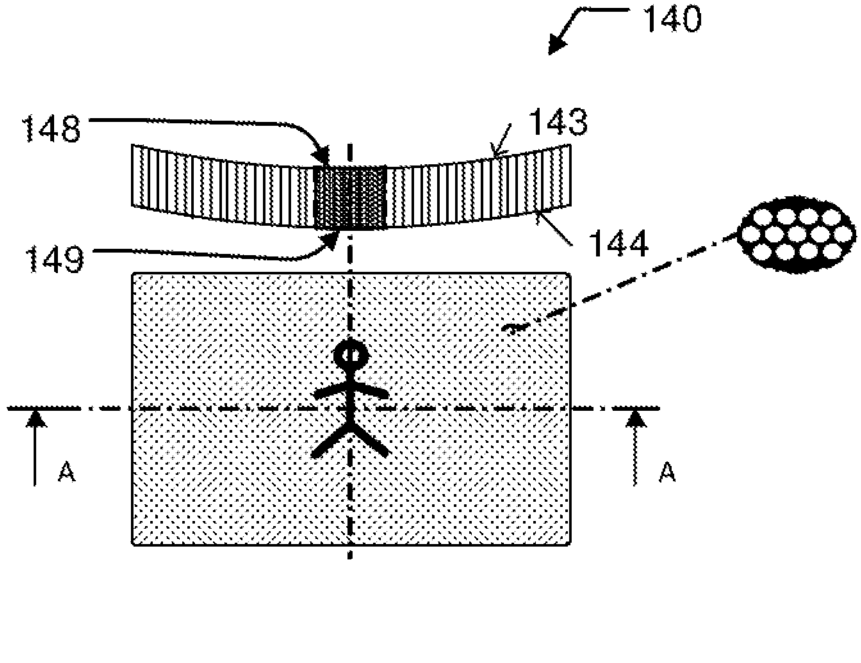
FIG. 2 illustrates the projection of an image in a fibre optic face plate according to an example.

FIG. 2 illustrates schematically transfer of an image at a first surface 143 of a face plate 140 to a second surface 144 of the face plate. The face plate surfaces 143, 144 are in this illustrated example both being curved. An image is projected onto the concave surface 148 of the face plate and transferred to the convex surface 149 thus translating, i.e. transferring, the image plane position without optical refraction. The resulting image in the convex surface is shown in the bottom part of FIG. 2. In FIG. 2, A shows the location of the longitudinal cross section showed in the second view, at the top of the figure. An alternative description of a face plate is that it can be used to transfer an image point from one side of the face plate to the other. This is a good way to transfer an image without affecting the focus of the image. To achieve the same effect with conventional optical elements, an extensive optical system is needed with side effects such as geometrical distortion.

In FIGS. *6a-6g* different examples of configurations of a fibre optic face plate 640 for use in a head up or head mounted display arrangement according to the disclosure of this patent application are disclosed.

In the illustrated examples, the fibre optic face plate 640 comprises a first side 641 having a first surface 643 and a second side 642 having a second surface 644. The fibre optic face plate is arranged to transmit light incident on the first surface 643 to the second surface 644. The face plate is arranged in relation to at least one image generating element such that the first surface 643 lies at a first image plane 646. A second image plane 647 lies at the second surface. The first image plane 646 comprises in some of the examples a plurality of first part image planes 646', 646". Each first part image plane 646', 646" is associated with an individual first part surface 643', 643" of the first side 641 of the fibre optic face plate. In other examples, the second image plane 647 may comprises also or instead a plurality of second part image planes each second part image plane associated with an individual second part surface of the second side of the fibre optic face plate.

In the illustrated examples, the fibre optical face plate has on one side two or more separate surfaces, and on the other side one common surface. The separate surfaces can have different shape, form, angle and size dependent on application. The common side of the faceplate component can be flat or curved, dependent on application.

The fine lines indicate in the illustrated examples the direction of the individual optical fibres (or fibre bundles), in the faceplate substrate. As shown in the examples the internal angle of the fibres in the substrate can vary dependent of the application. The first side of the fibre optic face plate comprises first optical fibre ends and the second side of the fibre optic face plate comprises corresponding second optical fibre ends. The fibre optic face plate is as described above arranged to transfer light from the first surface to the second surface through the optical fibres. The fibre length of the fibres transferring light from the first side of the fibre optic face plate to the other can have different lengths. Thereby, combining light where image planes do not coincide can be allowed.

In the illustrated examples, the fibre optical face plate can be arranged to transfer at least parts of the images generated by the different image generating elements to different parts of said common second image plane.

In not illustrated examples, the fibre optical faceplate is arranged to transfer at least parts of the images generated by the different image generating elements to adjacent positions in said common second image plane.

In not illustrated examples, the fibre optical face plate can be arranged to transfer the images generated by one image generating elements to different second image plane parts. The different second image plane parts may not be coinciding.

in not illustrated examples, the fibre optical faceplate is arranged to transfer the images generated one image generating elements so that each position in the first image plane is transferred to different second image plane parts. The different second image plane parts may or may not be coinciding.

Figure 3:
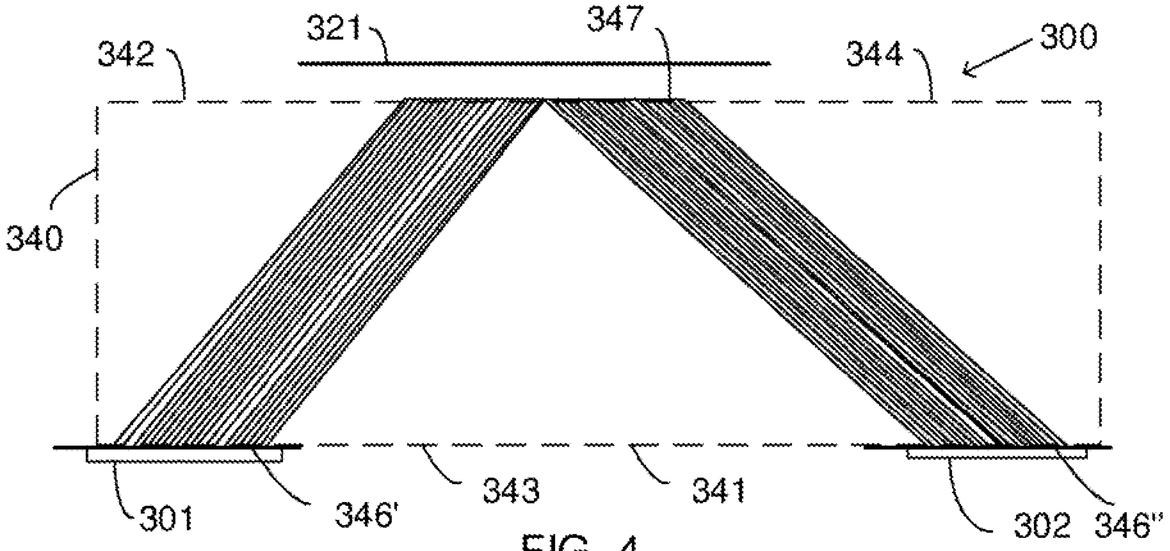
FIG. 3 illustrates a head up or head mounted display arrangement according to a first example embodiment of the disclosure.
Figure 4:
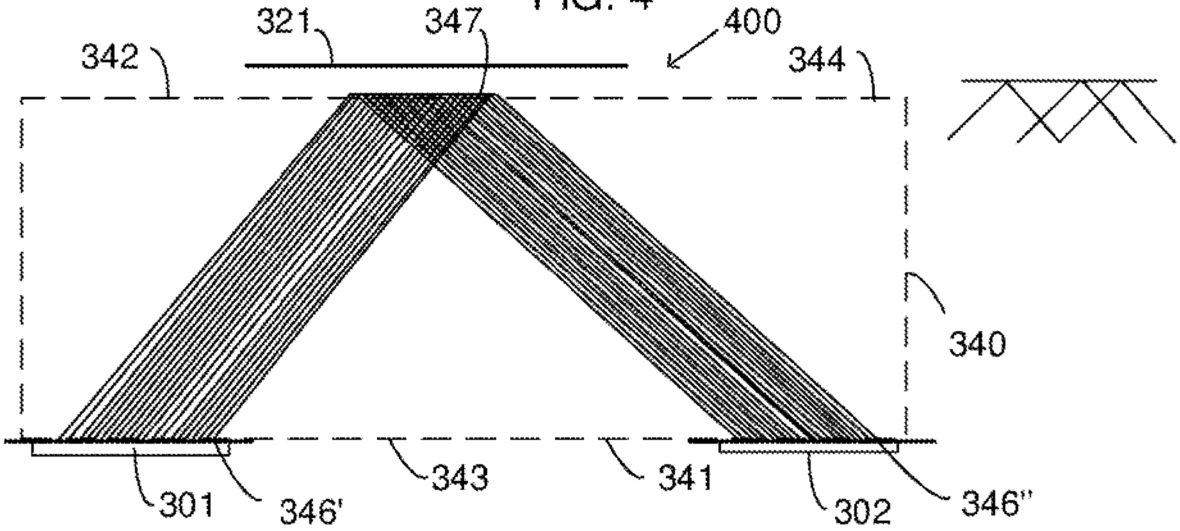
FIG. 4 illustrates a head up or head mounted display arrangement according to a second example embodiment of the disclosure.
Figure 5:
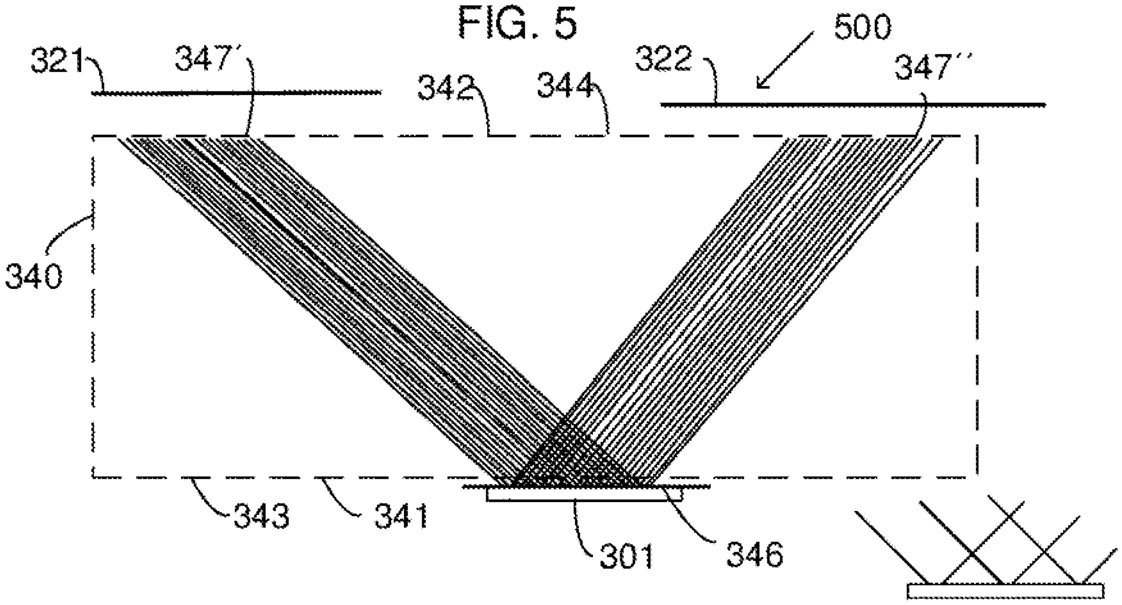
FIG. 5 illustrates a head up or head mounted display arrangement according to a third example embodiment of the disclosure.
Figure 6A:
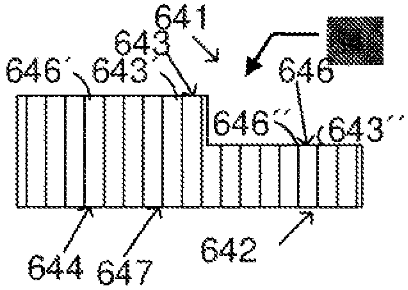
Figure 6B:
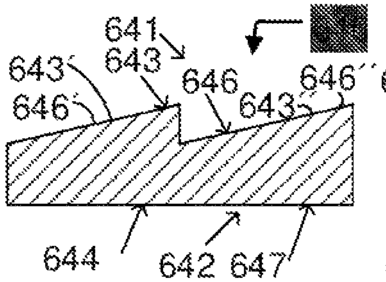
Figure 6C:
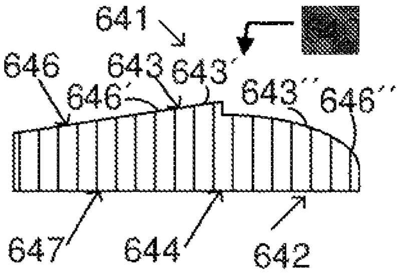
Figure 6D:
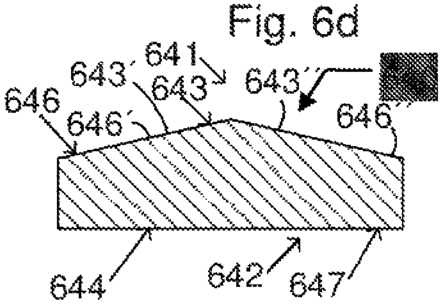
Figure 6E:
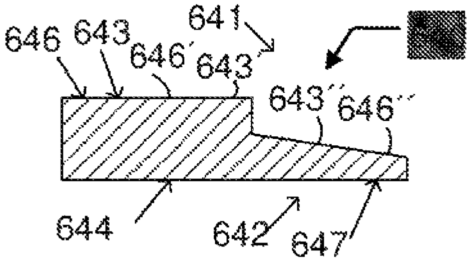
Figure 6F:
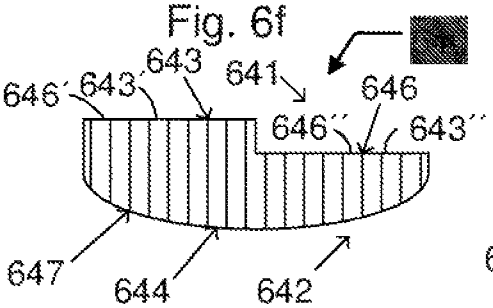
Figure 6G:
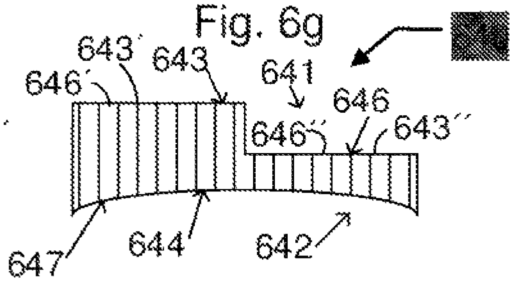

In FIGS. 3 to 5, head up or head mounted display arrangements 300, 400, 500 according to example embodiments of the disclosure are schematically disclosed. The head up or head mounted display arrangement comprises at least one image generating element 301, 302 arranged to generate an image in a first image plane 346', 346", 346. The at least one image generating element 301, 302 comprises for example a display such as a Liquid Crystal Display, e.g. a translucent LCD.

The head up or head mounted display arrangements further comprises a fibre optic face plate 340 comprising a first side 341 having a first surface 343 and a second side 342 having a second surface 344. The fibre optic face plate 340 is arranged to transmit light incident on the first surface 343 to the second surface 344. Examples of configurations of fibre optic face plates have been discussed for example in relation to FIG. 1, FIG. 2 and FIG. 6.

The fibre optic face plate is arranged in relation to the at least one image generating element such that the first surface 343 lies at the first image plane 346', 346", 346. A second image plane 347, 347', 347" lies at the second surface 344.

The head up or head mounted display arrangements 300, 400, 500 comprise further at least one surface element 321, 322. The at least one surface element 321, 322 is arranged in the beam path of a beam from the second surface 344. Accordingly, the at least one surface element 321, 322 is arranged to present said image emitted at at least one second image plane 347, 347', 347". The at least one surface element 321, 322 may be comprised in a Head Up Display, HUD. It is possible to arrange at least one further optical element between said at least one surface element 321, 322 and said at least one second image plane 347, 347', 347". It is possible to divide the beam path(s) between said at least one surface element 321, 322 and said at least one second image plane 347, 347', 347" into different separated beam paths, for example by said at least one further optical element. This might be advantageous when given certain space constraints or the like.

The first image plane comprises in different embodiments as illustrated in FIGS. 3 and 4 a plurality of first part image planes 346', 346". Each first part image plane is associated with an individual first part surface of the first side of the fibre optic face plate. Alternatively or in addition thereto, the second image plane comprises a plurality of second part image planes 347', 347". This is for example illustrated in FIG. 5. Each second part image plane is associated with an individual second part surface of the second side of the fibre optic face plate. In the illustrated examples, there are one first image plane and two second part image planes (FIG. 5) or two first part image planes and one second image plane (FIGS. 3 and 4). The at least one second image plane may be a focused image plane.

The fibre optic face plate 340 comprises a first surface with optic fibre ends and a second surface with corresponding optic fibre ends. The fibre optic face plate is adapted to transfer light from the first surface to the second surface through the optic fibres. The first surface 343 is arranged to receive an image from the image generating element(s) 301, 302. Thus, the fibre optic face plate is in the beam path of the respective image generating element so that the image generated by the image generating element enters the first surface 343 in the first image plane. The first surface 343 is characteristically arranged at focused image plane and thus the light of the image generating element(s) 301, 302 enters the optic fibre ends. The second surface 344 is arranged to direct the image to the surface element(s) 321, 322. The image generated by the image generator element(s) 301, 302 at the first surface is in focus; i.e. the same focus as of the image shown to the user of the head up or head mounted display arrangement. It is important that the image generated by the image generating element is in focus at the first surface of the fibre optic face plate. In other words, the level of focus of the image entering the face plate at the first surface will be the same as in the image exiting at the second surface.

In FIGS. 3 and 4, at least two image generating elements 301, 302 are each arranged to generate an image in the first part image plane at its associated first part surface of the first side of the fibre optic face plate. The first part surfaces of the first side of the fibre optic face plate can be arranged in different surface planes. The first part surfaces can instead lie in a common surface plane.

In FIG. 3, the fibre optical face plate 340 is arranged to transfer at least parts of the images generated by the different image generating elements 301, 302 to different parts of said common second image plane 347. Light incident on the respective first part surface may be transmitted to a corresponding second part surface on the second side. The least two image generating elements 301, 302 may be arranged to generate the same image. Thereby redundancy is obtained. Alternatively, the at least two image generating elements may be arranged to generate different images. For example, one image generating element is arranged to generate a two dimensional or the three dimensional map or other data such as radar image or an Infrared image. The other image generating element may be arranged to generate symbols.

In FIG. 4, the fibre optic faceplate 340 is arranged to transfer at least parts of the images generated by the different image generating elements to adjacent positions in a common second surface. The fibres from different fibre optical face plates may be mixed at the surface element. The least two image generating elements 301, 302 may be arranged to generate different colours. The least two image generating elements 301, 302 may be arranged to generate the same image. Thereby redundancy is obtained. Further, thereby a display image can be generated having an increased brightness. Alternatively, the at least two image generating elements may be arranged to generate different images. For example, one image generating element is arranged to generate a two dimensional or the three dimensional map or other data such as radar image or an Infrared image. The other image generating element may be arranged to generate symbols.

In order to produce a fibre optic face plate as disclosed in FIG. 4, the fibres of the face plate are sorted, either manually or using a sorting machine. The sorting may be performed such that fibre bundles at the second surface 343 are divided into bundle parts. Each bundle then comprises bundle parts sorted to different first surface parts 346', 346". This sorting may be performed while the fibre optic face plate is heated. This sorting may be performed in any other suitable way.

In FIG. 5, for each position of the first surface 343 incident light is transmitted to a plurality of second surface parts 347', 347". The second surface 344 may comprise a plurality of part surfaces each intended for a dedicated surface element 321, 322. Thus, the light from one image generator element 301 is divided into two parts. For example, the dividing of the light from the image generator element can be achieved in that double fibres or bundles are provided for each position within the image from the image generating element, wherein a first fibre or first fibre bundle of each pair is associated to one second fibre optic face plate surface part and the other fibre or fibre bundle of each pair is associated to another second fibre optics face plate surface part.

In order to produce a fibre optic face plate as disclosed in FIG. 5, the fibres of the face plate are sorted, either manually or using a sorting machine. The sorting may be performed such that fibre bundles at the first surface 343 are divided into bundle parts. Each bundle then comprises bundle parts sorted to different second surface parts 347', 347". This sorting may be performed while the fibre optic face plate is heated, or in any other suitable way.

In FIG. 7, head up or head mounted display arrangement 700 is disclosed. The head up or head mounted display arrangement 700 comprises at least one image generating element 701, a fibre optic face plate 740 and at least one surface element. In the shown example said surface element is a head up or head mounted display element 721. The head up or head mounted arrangement further comprises display image projecting optics. The display image projecting optics comprises in the illustrated figure at least one semi-transparent beam splitting element 770. The at least one semi-transparent beam splitting element 770 is arranged in the beam path from a second surface 744 of the fibre optic face plate 740. The semi-transparent beam splitting element 740 is arranged to reflect and project incident light to the at least one head up or head mounted display element 721. Thereby, the image of a second image plane 747 at an output side of the fibre optic face plate 740 is visible on the at least one head up display or head mounted display element 721 through said at least one semi-transparent beam splitting element 770. In the disclosed figure, an eye 31 views an image presented on the head up or head mounted display element through the semi-transparent beam splitting element 770. The semi-transparent beam splitting element is not described in detail herein. Such elements are generally known in the art. The head up or head mounted display arrangement disclosed in relation to FIG. 7 uses the characteristics of the semi-transparent beam splitting element that light incident at one surface of the beam splitting element is reflected and that the element is semi-transparent so that a human eye can see through the beam splitting element from its opposite surface. The transmissivity of the semi-transparent beam splitting element is typically around 50%. Thereby, the ability for the human eye to see through the semi-transparent beam splitting element can be prioritized.

The semi-transparent beam-splitting element is in the illustrated example formed in a plane. The design of the beam-splitting element is typically adapted to the design of the head up or head mounted display element 721 so that the image is correctly displayed at the head up or head mounted display element 721.

The plurality of semi-transparent beam-splitting elements may be projecting light incident from the second surface at a common head up or head mounted display element 721. The plurality of semi-transparent beam-splitting elements may each be arranged to project incident light at a dedicated head up or head mounted display element 721. Thus, in accordance with this example, one head up or head mounted display element 721 is associated to each semi-transparent beam-splitting element.

As is illustrated in the figure, ambient light is transmitted through the head up or head mounted display element and the eye of the viewer. Thereby, a scene behind the head up or head mounted display element is visible for the eye while at the same time the image projected by the head up or head mounted display element is visible to the eye 31.

The described example of FIG. 7 is only one possible embodiment. Other possible embodiments are for example off-axis solutions. Other solution can be performed without the need of a beam splitting element.

In a preferred example the surface element is a combiner. The surface element does not necessarily have to be a part of a head up display. Instead the surface element can be external to the head up display. Said combiner does not necessarily need to be a separate element. Instead, another element, such as a part of a prism, can operate as a combiner and the surface element can relate to that other element. The prism can have curved, flat, or freeform surfaces.

In FIG. 8, an example of a part of a head up or head mounted display arrangement is disclosed. The display arrangement part comprises at least one image generating element 801 and a fibre optic face plate 840 arranged in the beam path of an image from the image generating element, as disclosed herein. Further, an optical arrangement 850 is arranged in the beam path between the image generating element 801 and a first corresponding surface 843 of the fibre optic face plate 840. The optical arrangement 850 may comprise optical components such as lenses etc. The image generating element 801 is arranged to transmit light through said optical arrangement 850 so as to generate an image in a first image plane 846. In the illustrated example the first image plane 846 is arranged at the first surface 843 of the fibre optic face plate 840.

In another example, for example as disclosed in relation to FIGS. 3-5, the fibre optic face plate is arranged adjacent the image generating element. The fibre optic face plate may be placed on or against the image generating element.

In FIG. 9, embodiments of a method for presenting at least one image on at least one surface element of a head up or head mounted display arrangement are disclosed. The method comprises a step 51 of generating an image in a first image plane. The generation of the image may be obtained by means of an image generator element. A plurality of images can be generated by means of a plurality of image generating elements. In different embodiments, at least two image generating elements each generates an image in the first part image plane at its associated first part surface of the first side of the fibre optic face plate.

The method further comprises a step S2 of transmitting said image through a fibre optic face plate. The fibre optic face plate comprises a first side having a first surface lying in the first image plane, and a second side having a second surface lying in a second image plane. The first image plane comprises a plurality of first part image planes each first part image plane associated with an individual first part surface of the first side of the fibre optic face plate and/or the second image plane comprises a plurality of second part image planes each second part image plane associated with an individual second part surface of the second side of the fibre optic face plate. The number of first part image planes may be different from the number of second part image planes. The first part surfaces of the first side of the fibre optic phase plate may be arranged in different surface planes. The first part surfaces may lie in a common surface plane.

The light incident on the respective first part surface may be transmitted to a corresponding second part surface on the second side of the fibre optic face plate.

For each position of the first surface incident light may be transmitted to a plurality of second surface parts.

The second surface may comprise a plurality of part surfaces each intended for a dedicated surface element.

The fibre optic faceplate may transmit at least parts of the images generated by the different image generating elements to adjacent positions in a common second surface.

The method further comprises a step S3 of directing the image from the second surface to the surface element arranged in the beam path from the second surface. In different embodiments, the image at the second surface is directed to at least one semi-transparent beam splitting element arranged in the beam path from the second surface. The at least one beam splitter then projects incident light to the at least one surface element so that the image of the second image plane is visible via the surface element through said at least one semi-transparent beam splitting element. However, said beam splitting element is purely optional and not a requirement for the invention to work.

To sum up, the present disclosure relates to use of a faceplate in head up or head mounted display arrangements such as Head Up Display, HUD, arrangements. One or several faceplates will be used to combine different (part-) image planes into a common image plane. Thus light from different light sources can be combined to generate a common displayed image. By that light from several displays can simultaneously be displayed in the HUD. A first possible embodiment is that images from the different sources are displayed beside each other. To achieve this, the fibre ends of one faceplate part can, for example, all be put on one side of the final image plane and the fibre ends of another faceplate part can all be put on the other side of the final image plane. A second possible embodiment is that images from the different sources are "overlaying". This can be achieved by mixing the ends of the fibres from different faceplate parts. Instead of having first all ends of the fibres receiving an image from a first image generating element and then all ends of the fibres receiving an image from a second image generating element, these fibre ends are mixed so that, for example, a fibre end of a fibre receiving the image of the first image generating element is beside a fibre end of a fibre receiving the image of the second image generating element which is then beside a fibre end from the first image generating element again, and so on. The final image will thus look as if two (or more) images are overlaid each other.

The invention claimed is:

1. A method for presenting at least one image via at least one surface element of a head up or head mounted display arrangement, said method comprising:

generating an image in a first image plane, transmitting said image through a fibre optic face plate said fibre optic face plate comprising a first side having a first surface lying in the first image plane, and a second side having a second surface lying in a second image plane, and projecting the image from the second surface via the surface element arranged in the beam path of light emitted from the second surface, wherein:

the first image plane comprises a plurality of first part image planes each first part image plane associated with an individual first part surface of the first side of the fibre optic face plate, and the fibre optic faceplate transfers at least parts of the images from the plurality of first part surfaces to mutually overlapping positions in a common second surface.

2. The method according to claim 1, wherein the second surface comprises a plurality of part surfaces each intended for a dedicated surface element.

3. The method according to claim 1, wherein the image at the second surface is projected to at least one semi-transparent beam splitting element arranged in the beam path of light emitted from the second surface, said at least one beam splitter projecting light incident from the second surface to the at least one surface element so that the image of the second image plane is directed to the surface element via said at least one semi-transparent beam splitting element.

4. The method according to claim 2, wherein at least two image generating elements each generate an image in the first part image plane at its associated first part surface of the first side of the fibre optic face plate.

5. The method according to claim 2, wherein for each position of the first surface incident light is transmitted to a plurality of second surface parts.

6. The method according to claim 2, wherein said surface element is a combiner.

7. A method for presenting at least one image via at least one surface element of a head up or head mounted display arrangement, said method comprising:

generating an image in a first image plane, transmitting said image through a fibre optic face plate said fibre optic face plate comprising a first side having a first surface lying in the first image plane, and a second side having a second surface lying in a second image plane, and projecting the image from the second surface via the surface element arranged in the beam path of light emitted from the second surface, wherein:

the first image plane comprises a plurality of first part image planes each first part image plane associated with an individual first part surface of the first side of the fibre optic face plate, the second image plane comprises a plurality of second part image planes each second part image plane associated with an individual second part surface of the second side of the fibre optic face plate, and for each position of the first surface, incident light is divided and divergently transmitted to a plurality of second part surfaces.

8. The method according to claim 7, wherein the second surface comprises a plurality of part surfaces each intended for a dedicated surface element.

9. The method according to claim 7, wherein the image at the second surface is projected to at least one semi-transparent beam splitting element arranged in the beam path of light emitted from the second surface, said at least one beam splitter projecting light incident from the second surface to the at least one surface element so that the image of the second image plane is directed to the surface element via said at least one semi-transparent beam splitting element.

10. The method according to claim 8, wherein at least two image generating elements each generate an image in the first part image plane at its associated first part surface of the first side of the fibre optic face plate.

11. The method according to claim 8, wherein said surface element is a combiner.

* * * * *